United States Patent Office 3,196,975
Patented July 27, 1965

3,196,975
ACOUSTIC FOAM
Walter D. Voelker, Philadelphia, Pa., assignor, by mesne assignments, to Allied Chemical Corporation, New York, N.Y., a corporation of New York
No Drawing. Filed Dec. 13, 1962, Ser. No. 244,267
4 Claims. (Cl. 181—33)

This invention relates to acoustic foam and to acoustic panels characterized by most of the thickness of the panel consisting of a foam structure of organic plastic.

Heretofore much of the work relating to sound absorption has emphasized the mass of the sound absorbing substance. Recently acoustic systems have been developed utilizing open cell flexible polyurethane foam in which the resiliency of the open pore structure of the polyurethane foam made possible a significant degree of sound absorbency with relatively small mass. Some difficulty has been encountered in using conventional acoustic panels in kitchens and other areas subjected to dust and vapor. Substantially all acoustic panels have had exterior faces to which grease and dirt tended to cling and/or penetrate. Heretofore there have been suitable procedures for the manufacture of plastic foam having a closed cell structure and different methods for the production of open cell structure. Certain attempts have been made to develop methods for controlling the formulation of a foam forming mixture to be able to achieve a controlled proportion of closed cell structure and open cell structure in the same body of foam. Heretofore there have been demands for insulation panels having a significant degree of acoustical insulation characteristics, but difficulty has been encountered in meeting the demands because thermal insulation has generally required properties significantly different from those most effective in acoustical insulation.

In accordance with the present invention an acoustic foam is provided with comprises some closed cells but in which a major portion of the pore volume consists of open cell structure, whereby highly effective acoustical insulation is achieved together with an advantageous degree of thermal insulation properties.

In certain preferred embodiments of the present invention an acoustic panel having a thickness of at least 5 millimeters of said acoustic foam is provided with a readily washable facing surface consisting of a preformed plastic film substantially impervious to liquid water and having a thickness less than 100 microns, and being of a chemical composition different from that of the acoustic foam, the cell size of the acoustic foam adjacent to the plastic film having a diameter at least twice the thickness of the plastic film. In certain preferred embodiments of the method of making plastic foam, a precursor having a closed cell structure is subjected to high frequency sound having an energy and frequency adapted to transform the closed cell structure to a predominantly open cell structure without significant collapse of the precursor and without destroying completely the closed cell feature of a significant portion of the cells of the precursor and the precursor is thereafter subjected to a curing treatment to develop an acoustic foam, a major portion, but less than all, of the pore volume having open cell structure with a measurable significant amount of the total pore volume being closed cell structure.

The nature of the invention is further clarified by consideration of several examples.

*Example 1*

A foam forming composition suitable for the production of insulation panels may be made with the following formulation:

| | P.b.w. |
|---|---|
| Technical grade of nonapropoxysorbitol, such as tris (tripropyleneether) sorbitol, or other propylene oxide adduct of sorbitol having a molecular weight of the general magnitude of 722, or conveniently designated as propsorb 700 | 100 |
| Polyphenylenepolyisocyanate | 125 |
| Triethylenediamine catalyst | 0.5 |
| Dibutyltindilaurate catalyst | 0.1 |
| Silicon surfactant of type soluble in water | 1.5 |
| Trichlorofluoromethane | 29 |

The components are pumped at the correct proportions through a mixer and on to an advancing strip of plastic film having a thickness of about 15 microns, said film being preformed from polyglycolterephthalate. Approximately 3 seconds elapse during the flow of the components through the mixer on to the coating of metered thickness on the advancing plastic strip, and about 10 seconds of creaming time precede the rising time which normally is within the range from about 15 seconds to 40 seconds. After the foam has risen at least about ⅔ of its potential rise, it is subjected to a pore-opening treatment. The advancing strip having the rising precursor passes through a pore-opening zone in which it is subjected to a high frequency sound of about 26,000 cycles per second to open up the diaphragm portion of a significant number of the cells without disrupting the strength of the precursor so that the precursor does not undergo any significant collapse. When the sound energy is discontinued and the production line is maintained, with no energy in the zone which would be the pore opening zone, the maximum height of the finally cured foam is not more than 25% greater than achieved by the controlled pore opening operation. That is, the prevention of any significant collapse of the foam achieves a collapse which is less than such 25% of potential thickness. The pore opening zone corresponds to the travel of the precursor for less than 10 seconds and is generally of the magnitude of one second but the timing of such treatment is dependent upon such factors as the thickness of the acoustic panel, the cell size, the foam density, the gel strength, sound intensity, temperature and related variables. The precursor advances into a curing zone in which it is transformed into a polyurethane foam having the strength characteristics desirable in a semi-rigid or rigid insulation panel. The cured polyurethane foam is desirably covered with a preformed sheet of plastic foam such as a 15 micron film of the polyester of ethyleneglycol and terephthalic acid.

The pore size of the plastic foam adjacent to each of the film faces is greater than 30 microns, that is greater than twice the thickness of the facing film. The film is substantially transparent to sound waves so that the acoustic panel absorbs the sound waves instead of reflecting them, such absorbency being attributable in part to the predominantly open cell structure of the acoustic foam, and attributable in part to the ratio of the pore diameter to the film thickness, so that sound waves pass through the facing sheet and into the interconnected open pore structure of the semi rigid acoustic foam. The smooth facing sheet makes feasible the easy washing of the acoustic panel, to which dirt and grease do not readily cling.

*Example 2*

A polyurethane foam panel is prepared following the general procedure of Example 1 but employing in the formulation of proportion of silicone surfactant about three times greater than indicated, whereby a predominantly open cell foam panel is achieved. By this method, no high frequency sound and/or pore opening zone is necessary inasmuch as a structure characterized by predominantly open pore structure is achieved by the control of the chemical formulation. The plastic foam is useful as an acoustic panel without the plastic film facing sheet, especially for installation at locations in which ease of cleaning is not of paramount importance. In designating the acoustic foam as predominantly open pore structure, it is meant that more than 50% of the pore volume is interconnected as an open pore structure while retaining in the acoustic foam at least some pores having a closed cell sturcture, whereby the acoustic foam has thermal insulation characteristics superior to the purely open cell structure.

*Example 3*

The high frequency sound technique for opening the pores of a closed cell structure has applicability not merely to the semi-rigid and rigid polyurethane foam but also to flexible polyurethane foam and to polyurethane foam froth and to precursors for plastic foams of a chemical composition different from polyurethane. The brief treatment with a controlled intensity of high frequency sound disrupts the thinnest portion of the diaphragm section of the walls of a pore or cell without impairing the gel strength of the web portion or relatively thick portion of a column common to two or more cells. Thus the treatment with controlled intensity high frequency sound does not significantly collapse the thickness of the precursor, but does transform it from predominantly closed cell structure to predominantly open cell structure. The frequency of the sound is generally less than 200,000 cycles per second and generally more than 2,000 cycles per second, the higher frequency sound being effective during briefer periods and at lower intensities than sounds in the lower frequency range. A reasonably wide range of frequencies, including a fluctuation of about 100% during about 500,000 micro-seconds has advantages in some applications, inasmuch as it has an effect upon a greater variety of cell diaphragm conditions. It is often cheaper but sometimes less effective to provide a source of sound which simultaneously produces a wide range of high frequency vibrations.

*Example 4*

A flexible polyurethane foam froth is applied as a coating on to an advancing backing strip of burlap and advances toward a curing zone. While the polyurethane froth precursor has significant gel strength but prior to the curing of the structure into a strong plastic foam, it is subjected to a pore opening zone and for a period of ¾ of a second is subjected to a loud warbling sound fluctuating within the range from about 4,000 to about 16,000 cycles per second. The flexible precursor is thus transformed into a predominantly open pore structure without any significant collapse of the precursor. Subsequent to such pore opening zone, the precursor advances through a curing zone for development into a fully cured flexible polyurethane foam. The thus prepared multilayer structure is trimmed to provide a product of uniform thickness, and the thus smoothened surface is adhered to a facing sheet of preformed film of polyhexafluoropropylene having a thickness of 30 microns. The average pore diameter of the foam is more than 60 microns, so that the ratio of pore diameter to film thickness is greater than 2 to 1. The acoustic foam has a thickness of approximately 2 centimeters. The acoustic panel is effective in absorbing sounds and has the further advantage of being readily cleaned.

*Example 5*

A sandwich structure comprising a backing sheet of preformed plastic film and a facing sheet of preformed plastic film and a core of acoustic foam is prepared on a production line for the preparation of polyurethane foam sandwich structures. The metered thickness of polyurethane foam-forming composition is the core of an advancing sandwich structure which passes through zones including a creaming zone and a rising zone. An important advantage of the method of opening pores by the application of a high frequency sound wave is that the sound can be transmitted through thin plastic film. Thus the precursor sandwich having a core having significant gel strength but not strong enough for use as plastic foam may be subjected to the high frequency sound waves of a warbling whistle energized by a compressed air stream. During the passage of a portion of the precursor through the pore opening zone, the warbling high frequency sound wave, fluctuating within the range from about 18,000 to 36,000 cycles per second brings about the rupture of the diaphragm portions of the cell walls. A major portion of the pore volume of the precursor consists of open cell structure as a result of said treatment with high frequency sound waves impinging on either one or both of the plastic film faces of the sandwich structure. After the treatment in the pore opening zone, the precursor is advanced through a curing zone and thereafter to any of the appropriate product finishing zones. If desired the thus prepared sandwich may be split to provide two strips of acoustic foam having the desired facing sheet of preformed plastic film, whereby the acoustic panel may be more readily maintained and cleaned.

Various modifications of the invention are possible without departing from the scope of the appended claims.

The invention claimed is:

1. A polyurethane foam panel having both thermal insulation and acoustical insulation properties and having a facing readily washable and repellent to the adherence of dirt thereon comprising a single layer body portion of flexible polyurethane foam and a preformed plastic facing sheet securely bonded thereto, said plastic facing sheet having a thickness of less than 100 microns and said polyurethane foam body portion comprising both open cell and closed cell pores, each in significant proportion, with a major portion of the pore volume being of open cell structure.

2. A polyurethane foam panel having both thermal insulation and acoustical insulation properties and having a facing readily washable and repellent to the adherence of dirt thereon comprising a single layer body portion of flexible polyurethane foam of a thickness of at least 5 millimeters and a preformed plastic facing sheet securely bonded thereto, said plastic facing sheet being substantially impervious to liquid water and having a thickness of less than 100 microns and said polyurethane foam body portion comprising both open cell and closed cell pores, each in significant proportion, with a major portion of the pore volume being of open cell structure.

3. A polyurethane foam panel having both thermal insulation and acoustical insulation properties and having a facing readily washable and repellent to the adherence of dirt thereon comprising a single layer body portion of flexible polyurethane foam of a thickness of at least 5 millimeters and a preformed plastic facing sheet securely bonded thereto, said plastic facing sheet being substantially impervious to liquid water and having a thickness of less than 100 microns and said polyurethane foam body portion comprising both open cell and closed cell pores, each in significant proportion, with a major portion of the pore volume being of open cell structure and the cells adjacent the plastic facing sheet having an average cell diameter of at least twice the thickness of said sheet.

4. A polyurethane foam panel having both thermal insulation and acoustical insulation properties and having a facing readily washable and repellent to the adherence of dirt thereon comprising a single layer body portion of flexible polyurethane foam of a thickness of at least 5 millimeters and a preformed facing sheet composed of a polymer formed by reaction of ethylene glycol and terephthalic acid and of a thickness of less than 100 microns securely bonded thereto, said polyurethane foam body portion comprising both open cell and closed cell pores, each in significant proportion, with a major portion of the pore volume being of open cell structure and the cells adjacent the facing sheet having an average cell diameter of at least twice the thickness of said sheet.

References Cited in the file of this patent
UNITED STATES PATENTS

| | | | |
|---|---|---|---|
| 2,001,916 | 5/35 | Mazer | 181—33 |
| 2,802,764 | 8/57 | Slayter et al. | 181—33 |
| 2,841,205 | 7/58 | Bird | 181—33 |
| 2,855,039 | 10/58 | Gross | 181—33 |
| 2,956,310 | 10/60 | Roop et al. | 161 |
| 2,961,710 | 11/60 | Stark | 18—48 |
| 2,981,360 | 4/61 | Fritze et al. | 181—33 |
| 2,994,110 | 8/61 | Hardy | 181—33 |
| 3,000,464 | 9/61 | Watters | 181—33 |
| 3,016,575 | 1/62 | Ebneth | 181—33 |
| 3,061,885 | 11/62 | Rogers et al. | 18—48 |
| 3,092,203 | 6/63 | Slayter et al. | 181—33 |
| 3,126,978 | 3/64 | Bergstrom | 181—33 |

LEO SMILOW, *Primary Examiner.*

MORRIS SUSSMAN, LEYLAND MARTIN,
*Examiners.*